United States Patent
Liu et al.

(10) Patent No.: US 9,585,055 B2
(45) Date of Patent: Feb. 28, 2017

(54) METHOD AND BASE STATION OF ADJUSTING UPLINK LOAD VARIANCE DUE TO UPLINK BEAM DIRECTION CHANGE

(75) Inventors: Jinhua Liu, Beijing (CN); Zhang Zhang, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 245 days.

(21) Appl. No.: 14/002,672

(22) PCT Filed: Jan. 31, 2012

(86) PCT No.: PCT/CN2012/070785
§ 371 (c)(1),
(2), (4) Date: Aug. 30, 2013

(87) PCT Pub. No.: WO2012/116584
PCT Pub. Date: Sep. 7, 2012

(65) Prior Publication Data
US 2013/0336112 A1    Dec. 19, 2013

(30) Foreign Application Priority Data
Mar. 2, 2011 (CN) .......................... 2011 1 0054026

(51) Int. Cl.
*H04W 28/02* (2009.01)
*H04B 7/04* (2006.01)
(Continued)

(52) U.S. Cl.
CPC ...... *H04W 28/0289* (2013.01); *H04B 7/0404* (2013.01); *H04B 7/0623* (2013.01);
(Continued)

(58) Field of Classification Search
CPC H04W 28/0289; H04B 7/0623; H04B 7/0404
See application file for complete search history.

(56) References Cited

U.S. PATENT DOCUMENTS

2004/0136342 A1*  7/2004  Pedersen et al. ............. 370/335
2006/0215608 A1*  9/2006  Lee et al. ...................... 370/331
(Continued)

FOREIGN PATENT DOCUMENTS

| CN | 1528099 A | 9/2004 |
|---|---|---|
| CN | 1802014 A | 7/2006 |
| CN | 1984446 A | 6/2007 |
| WO | WO-02091779 | 11/2002 |

OTHER PUBLICATIONS

Notification of Completion of Formalities for Registration and Notification of Grant of Rights for Invention Patent, CN Application No. 201110054026.0, dated Nov. 6, 2014, 4 pages.
(Continued)

*Primary Examiner* — Jackie Zungia Abad
(74) *Attorney, Agent, or Firm* — Patents on Demand, P.A.; Brian K. Buchheit; Scott M. Garrett

(57) ABSTRACT

The present invention provides a method of adjusting uplink load variance due to a change of a beam direction turning from towards a current beamforming control cell to towards a target beamforming control cell, comprising: estimating an uplink load increment of the target beamforming control cell due to the change of the beam direction, before the beam direction turning from towards the current beamforming control cell to towards the target beamforming control cell; comparing the estimated uplink load increment with an available uplink load headroom of the target beamforming control cell; and adjusting an uplink load grant of a user equipment if the uplink load increment is larger than the available uplink load headroom, so that an uplink load increment is not beyond the available uplink load headroom, so that the uplink load increment is not beyond the available uplink load headroom.

20 Claims, 2 Drawing Sheets

(51) Int. Cl.
*H04B 7/06* (2006.01)
*H04W 28/08* (2009.01)
*H04W 88/08* (2009.01)

(52) U.S. Cl.
CPC .......... *H04B 7/0617* (2013.01); *H04B 7/0634* (2013.01); *H04W 28/08* (2013.01); *H04W 88/08* (2013.01)

(56) References Cited

U.S. PATENT DOCUMENTS

| 2008/0279121 | A1 | 11/2008 | Englund et al. | |
|---|---|---|---|---|
| 2009/0088080 | A1 | 4/2009 | Zhang et al. | |
| 2011/0176593 | A1* | 7/2011 | Hultell | H04B 7/0404 375/224 |
| 2012/0188889 | A1* | 7/2012 | Sambhwani | H04B 7/0404 370/252 |

OTHER PUBLICATIONS

First Office Action, Application No. 201110054026.0, dated Jan. 24, 2014, 6 pages.
Second Office Action, Application No. 201110054026.0, dated Jul. 17, 2014, 8 pages.
Extended EP Search Report and Written Opinion, Application No. EP 12751868.6, 4 pages.
Huawei, Hisilicon, "Initial considerations on Uplink Closed Loop Transmit Diversity", 3GPP TSG RAN WG1 Meeting #63bis, R1-110309, Jan. 17-21, 2011, 5 pages, 3GPP Draft, vol. RAN WG1, 3rd Generation Partnership Project (3GPP) Mobile Competence Centre, Sophia-Antipolis Cedex, France.
International Search Report, Application No. PCT/CN2012/070785, May 3, 2012, 4 pages.
"3rd Generation Partnership Project; Technical Specification Group Radio Access Network; Universal Terrestrial Radio Access (UTRA); Uplink transmit diversity for High Speed Packet Access", 3GPP TR 25.863 V11.0.0, Dec. 2011, 222 pages.
"Link Analysis of UL CLTD in Soft Handover Scenarios", 3GPP TSG RAN WG1 Meeting #64, R1-111148, Feb. 21-25, 2011, 14 pages, Qualcomm Incorporated.
Holma, Harri, et al., "WCDMA for UMTS: Radio Access for Third Generation Mobile Communications", 3rd Edition, 2004, 479 pages, John Wiley & Sons, Ltd.
"Uplink Tx Diversity for HSPA", 3GPP™ Work Item Description, Sep. 17, 2009, 5 pages.
International Preliminary Report on Patentability, Application No. PCT/CN2012/070785, Sep. 3, 2013, 9 pages.

\* cited by examiner

METHOD AND BASE STATION OF ADJUSTING UPLINK LOAD VARIANCE DUE TO UPLINK BEAM DIRECTION CHANGE

CROSS-REFERENCE TO RELATED APPLICATIONS

This application is a National stage of International Application No. PCT/CN2012/070785, filed Jan. 31, 2012, which claims priority to CN Application No. 201110054026.0, filed Mar. 2, 2011, which are hereby incorporated by reference.

TECHNICAL FIELD

The present invention relates to methods and base stations for ensuring uplink stability in a communication system, and particularly to a method of adjusting uplink load variance due to uplink beam direction change and a base station therefor.

BACKGROUND

Uplink Beam Forming

Currently, the Third Generation Partnership Project (3GPP) is evaluating the potential benefits of uplink transmit diversity in the context of High-Speed Uplink Packet Access (HSUPA) (see 3GPP Tdoc RP-090987, 3GPP Work Item Description: Uplink Tx Diversity for HSPA). With uplink transmit diversity, UEs that are equipped with two or more transmit antennas are capable of utilizing all of them. This may be achieved by multiplying the transmit signal s(t) with a weight factor $W=[w_1, w_2, \ldots, w_i, \ldots, w_M]$. The term weight factor can also be referred to as a precoding vector. Referring to FIG. 1, which shows a schematic diagram of uplink transmit diversity. Note that $i=1 \ldots M$, where M denotes the number of transmit antennas. The rationale behind uplink transmit diversity is to adapt weights so that the user and network performance can be maximized in case of beam forming where the UE can transmit from more than one antenna simultaneously at a given time-instance.

According to whether there is an explicit feedback from a Node B, the uplink beam-forming can be divided into two types:

Open Loop Beam Forming (OLBF): the UE autonomously decides the antenna weights. The UE selects the precoding vector with the assist of the existing feedback from the Node B, such as Uplink Transmit Power Control (UL TPC), Hybrid Automatic Repeat Request (HARQ) feedback, etc.

Close Loop Beam Forming (CLBF): the Node-B provides an explicit feedback to the UE stating which weights the UE should use when transmitting the signal.

The study on Open Loop Transmit Diversity (OLTD) was disclosed in 3GPP TR 25.863, Uplink transmit diversity for High Speed Packet Access (HSPA) (Release 10). For a UE in an OLBF mode, the uplink beam direction is adjusted by the UE based on the received uplink TPCs.

When the UE is in soft handover, uplink TPC commands from all connected Node Bs in a slot are combined according to the following policy: the combined TPC is UP if the TPCs received from all connected Node Bs are UP and the combined TPC is DOWN if any of the TPCs received from the connected Node Bs is DOWN.

The best connected Node B in uplink for a UE in soft handover has higher opportunity to generate uplink TPC DOWN than other connected Node Bs. Hence, the best connected Node B is dominant in TPC combining according to this TPC combining policy. The UE in OLBF mode does channel sounding by adjusting the uplink beam direction in opposite directions and compares the uplink TPCs corresponding to the two opposite directions. If a TPC DOWN is received in one direction and a TPC UP is received in the opposite direction, then the UE turns the uplink beam towards the former direction. As the best cell is dominant in TPC combining for a UE in soft handover, the UE turns the uplink beam towards the best connected Node B gradually. If the best Node B in uplink changes, the uplink beam changes gradually towards the new best Node B. When the uplink beam direction adjustment is done at a side of the UE in the OLBF mode, the network is not notified.

Currently, the investigation of Close Loop Transmit Diversity (CLTD) was started and driven by the main vendors of wireless communication systems in 3GPP. In case of CLBF, it is not decided whether only a serving cell (or a Node B) determines a precoding vector or non-serving cells can also generate and determine the precoding vector. In order to avoid RoT oscillation due to frequent uplink beam direction change from one active cell to another, it is better that a servicing Node B rather than a non-serving Node B generates and determines the precoding vector. It is also possible that a non-serving cell (or a Node B) generates and determines the precoding vector for some other purpose. The uplink beams of a UE in CLBF mode direct to the active cell that generates and determines the precoding vector.

Hereinafter, a CLBF/OLBF UE means a UE in CLBF/OLBF mode rather than a CLBF/OLBF capable UE only, and the cell to generate and determine the precoding vector for a UE in uplink beam forming (BF) mode is referred to as BF-control cell for this UE. For an OLBF UE, a cell having the best uplink quality is usually a BF-control cell.

Uplink Beam Direction Change During Handover

When a BF-control cell of a CLBF UE changes from one cell to another, the uplink beam of the CLBF UE turns from towards the current BF-control cell towards the target BF-control cell as well. Refer to FIG. 2, which shows an example of uplink beam direction change. As shown in FIG. 2, Cell A and Cell B are two active cells of a UE. Before uplink beam direction of the CLBF UE is changed, Cell A is the BF-control cell of the UE and experiences interference from the main lobe while Cell B is one non-BF-control cell and experiences interference from a weaker lobe. After the beam is changed, Cell B turns to be the BF-control cell and experiences interference from the main lobe while Cell A turns to be one non-BF-control cell and experiences interference from a weaker lobe. When the beam changes from Cell A to Cell B, the uplink load of Cell A due to this CLBF UE is suddenly decreased but the uplink load of Cell B due to this CLBF UE is suddenly increased.

The uplink beam direction change for an OLBF UE is not clear for the network because the network does not explicitly control precoding of uplink beams. Dependent on algorithms for selecting the precoding vector in the UE and fading changes, the required time of BF-control cell change can be quite different. If the uplink beam direction changes too fast for an OLBF UE, there can be uplink stability problem for a cell connected with the OLBF UE.

The beam direction changes as the BF-control cell changes. The beam direction change is unavoidable and can be very often due to mobility of users.

Uplink Load Estimation

The uplink load of a UE can be estimated based on CIR of DPCCH. Suppose a UE has N parallel uplink channels, the total uplink load that a UE generates can be estimated based on DPCCH CIR as (see "WCDMA for UMTS—Radio Access For Third Generation Mobile Communications", third Edition, Harri Holma, Antti Toskala, the disclosure of which is incorporated herein in its entirety by reference):

$$\text{Load} = \frac{CIR_{DPCCH} \cdot \left(1 + \sum_{i=1}^{N-1} pwroff_i\right)}{Antgain + (1 - \text{orthogonality}) \cdot CIR_{DPCCH} \cdot \left(1 + \sum_{i=1}^{N-1} pwroff_i\right)}, \quad (1)$$

where $CIR_{DPCCH}$ is a (estimated) DPCCH CIR and can be either a target DPCCH CIR or a measured DPCCH CIR; $Pwroff_i$ is a power offset of the $i^{th}$ channel with respect to DPCCH; Antgain is an (estimated) antenna gain; and orthogonality is a (estimated) channel orthogonality.

For uplink beam-forming users, when a BF-control cell for an uplink beam-forming UE changes, the beam direction changes from the current BF-control cell to the target BF-control cell can result in sudden uplink load decrease in the current BF-control cell and sudden uplink load increase in the new BF-control cell, which further causes the RoT oscillation in both current BF-control cell and target BF-control cell. Take FIG. 2 as an example. Before the uplink beam direction change (i.e., BF-control cell change), Cell A is a BF-control cell and Cell B is a non-BF-control cell, and uplink loads generated by UEs in Cell A and Cell B are $L_{A,0}$ and $L_{B,0}$, respectively. After the uplink beam direction change, Cell A turns to be a non-BF-control cell while Cell B turns to be the BF-control cell, and uplink loads generated in Cell A and Cell B are $L_{A,1}$ and $L_{B,1}$, respectively. Because uplink beam forming is used, the load generated by the UE in Cell A is decreased ($L_{A,1} < L_{A,0}$) and the load generated by the UE in Cell B is increased ($L_{B,1} > L_{B,0}$) if the uplink load grant of UE is not changed during BF-control cell change. According to 3GPP protocols, an uplink load grant is the maximum power offset of the load, which can be used by the user, with respect to the uplink DPCCH power, and an uplink load grant for a user determines the maximum number of bits in uplink transport data blocks for the user. One active cell of an UE may evaluate using such a parameter the maximum allowed uplink load generated by the UE in the cell.

This RoT oscillation in the cell is serious when one or more of the following conditions are satisfied:

The target BF-control cell already has a high uplink load

The uplink beam-forming UE is causing a high uplink load

The UE has good uplink beam forming capability

The similar problem also exists when the BF mode is activated for a UE from the other modes (e.g., a default mode). The uplink load of the UE in the BF-control cell can also increase due to the main lobe directs to this cell compared to without uplink beam-forming.

Due to the change of the UE beam direction, the caused RoT peak in the new BF-control cell (i.e., the target BF-control cell) can exceed the RoT target quite much and triggers congestion actions, which deteriorates the uplink performance.

SUMMARY

In order to ensure uplink stability when the uplink beam direction of a beam-forming UE is changed, the basic ideas of the present invention lie in:

Handling of a cell load change due to an uplink beam direction change of a CLBF UE The network takes actions to control the RoT oscillation in the target BF-control cell within the acceptable range.

Handling of a cell load change due to an uplink beam direction change of an OLBF UE A certain set of limits can be pre-defined to regulate an uplink beam direction change of the OLBF UE in soft handover so that the target BF-control cell can have enough time to control load variation due to the uplink beam direction change of this UE within an acceptable range.

Load handling of an activation of uplink beam forming

The BF-control cell can pre-adjust the uplink load in this cell if necessary so that the uplink upload increased in the cell by the UE does not exceed the available uplink headroom when uplink beam forming is to be activated for a serving cell UE. The "headroom" here refers to assigned uplink capability, and uplink load headroom of one cell may be obtained by subtracting uplink capability that has been assigned from the maximum allowed assigned uplink capability of this cell and may be updated by this cell in real time.

In view of this, according to an aspect of the present invention, a method of adjusting uplink load variance due to a change of a beam direction turning from towards a current beamforming control cell to towards a target beamforming control cell is provided. The method comprises steps of estimating an uplink load increment of the target beamforming control cell due to the change of the beam direction, before the beam direction turning from towards a current beamforming control cell to towards a target beamforming control cell; comparing the estimated uplink load increment with an available uplink load headroom of the target beamforming control cell; and adjusting an uplink load grant of a user equipment UE if the uplink load increment is larger than the available uplink load headroom, so that the uplink load increment is not beyond the available uplink load headroom.

The method further comprises not adjusting the uplink load grant of the UE, if the uplink load increment is not larger than the variable uplink load headroom.

A UE in a close loop beamforming CLBF mode determines a precoding vector based on an explicit feedback from a base station, the feedback indicating the precoding vector which should be used when signals are transmitted by the UE, so that the beam from the UE in the CLBF mode is initially directed towards the current beamforming control cell.

After the uplink load grant is adjusted, the target beamforming control cell starts to generate and determine a precoding vector of a UE in a close loop beamforming CLBF mode, so that the beam from the UE in the CLBF mode is directed towards the target beamforming control cell, and the current beamforming control cell stops to generate and determine a precoding vector of the UE in the CLBF mode which causes the beam to direct towards the current beamforming control cell.

The uplink load increment of the target beamforming control cell due to the change of the beam direction is estimated for a UE in a close loop beamforming CLBF mode, depending on a measurement of a dedicated physical control channel DPCCH of the UE.

The uplink load increment of the target beamforming control cell due to the change of the beam direction is estimated for the UE in the CLBF mode, depending on an uplink load difference between an uplink load estimated based on a target DPCCH carrier interference ratio CIR of the UE and an uplink load estimated based on a DPCCH CIR measured in the target beamforming control cell.

The uplink load increment of the target beamforming control cell due to the change of the beam direction is estimated for a UE in an open loop beamforming OLBF mode by using an empirical beam forming gain.

The method further comprise: delaying the change of the beam direction turning from towards the current beamforming control cell to towards the target beamforming control cell for the UE in the CLBF mode, during which the current beamforming control cell maintains to generate and determine the precoding vector, and the beam direction maintains towards the current beamforming control cell.

The estimating, comparing and adjusting steps are performed during the delay.

The uplink load grant of the UE is decreased to a predetermined conservative level before the change of the beam direction when the current beamforming control cell of the UE cannot accurately obtain the uplink load increment, so that the uplink load increment is not beyond the available uplink load headroom after the beam is directed towards the target beamforming control cell.

According to another aspect of the present invention, a base station for adjusting uplink load variance due to a change of a beam direction turning from towards a current beamforming control cell to towards a target beamforming control cell is provided. The base station comprise: an estimation unit, configured to estimate an uplink load increment of the target beamforming control cell due to the change of the beam direction, before the beam direction turning from towards a current beamforming control cell to towards a target beamforming control cell; a comparison unit, configured to compare the estimated uplink load increment with an available uplink load headroom of the target beamforming control cell; and an adjustment unit, configured to adjust an uplink load grant of a user equipment UE so that the uplink load increment is not beyond the available uplink load headroom, if the uplink load increment is larger than the available uplink load headroom.

The adjustment unit does not adjust the uplink load grant of the UE, if the uplink load increment is not larger than the variable uplink load headroom.

The base station further comprises a precoding vector generation and determination unit, configured to generate and determine, for a UE in a close loop beamforming CLBF mode, a precoding vector which should be used when signals are transmitted, so that the beam from the UE in the CLBF mode is adjusted to initially direct towards the current beamforming control cell.

After the uplink load grant is adjusted, the precoding vector generation and determination unit starts to generate and determine a precoding vector of a UE in a close loop beamforming CLBF mode, so that the beam from the UE in the CLBF mode is directed towards the target beamforming control cell, and stops to generate and determine a precoding vector of the UE in the CLBF mode which causes the beam to direct towards the current beamforming control cell.

The estimation unit estimates, for a UE in a close loop beamforming CLBF mode, the uplink load increment of the target beamforming control cell due to the change of the beam direction, depending on a measurement of a dedicated physical control channel DPCCH of the UE.

The estimation unit estimates, for a UE in a close loop beamforming CLBF mode, the uplink load increment of the target beamforming control cell due to the change of the beam direction, depending on an uplink load difference between an uplink load estimated based on a target DPCCH carrier interference ratio CIR of the UE and an uplink load estimated based on a DPCCH CIR measured in the target beamforming control cell.

The estimation unit estimates, for a UE in an open loop beamforming OLBF mode, the uplink load increment of the target beamforming control cell due to the change of the beam direction by using an empirical beam forming gain.

The base station further comprises: a delay unit, configured to delay the change of the beam direction turning from towards the current beamforming control cell to towards the target beamforming control cell for the UE in the CLBF mode, during which the current beamforming control cell maintains to generate and determine the precoding vector, and the beam direction maintains towards the current beamforming control cell.

The estimation unit, the comparison unit and the adjustment unit operate during the delay.

The uplink load grant of the UE is decreased to a predetermined conservative level before the change of the beam direction when the current beamforming control cell of the UE cannot accurately obtain the uplink load increment by the estimation unit, so that the uplink load increment is not beyond the available uplink load headroom after the beam is directed towards the target beamforming control cell.

BRIEF DESCRIPTION OF THE DRAWINGS

The above and other objects, features and advantages will be more apparent from the following description of embodiments with reference to the figures, in which.

DETAILED DESCRIPTION OF EMBODIMENTS

The illustrative embodiments of the present invention will be detailed below with reference to the drawings. Although the illustrative embodiments take a WCDMA network as an example, it should be appreciated that the present invention is not limited to this. The illustrative embodiments are illustrative only, rather than limiting the scope of the present invention, and any solution employing the embodiments of the present invention should fall into the scope of the present invention. The present invention may be also applied in other networks as well, for instance, CDMA, TD-SCDMA, CDMA2000, LTE, and other interference shared networks.

Figure 1:
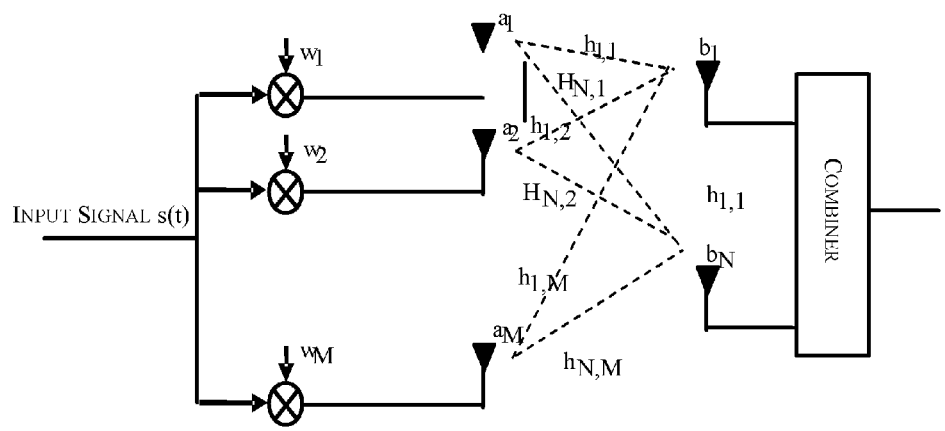
FIG. 1 schematically shows a diagram of uplink transmit diversity in a communication system.
Figure 2:
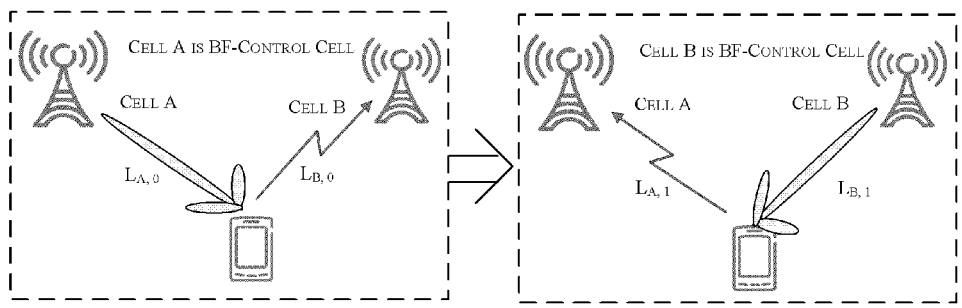
FIG. 2 schematically shows an example of uplink beam direction change in a communication system.
Figure 3:
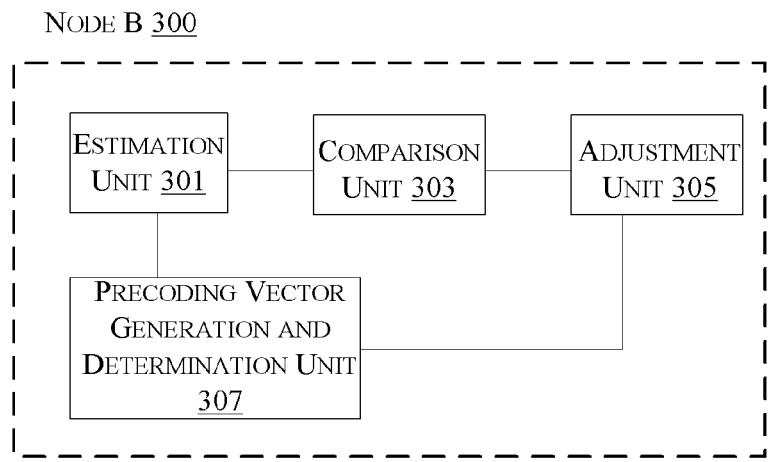
FIG. 3 shows a structural block diagram of a base station according to an embodiment of the present invention.

Reference now is made to FIG. 3, which describes a structure of a Node B 300 according to an embodiment of the present invention. The Node B 300 according to the embodiment of the present invention may adjust uplink load variance due to a change of a beam direction turning from towards a current BF-control cell (i.e., Cell A) to towards a target BF-control cell (i.e., Cell B).

As shown in FIG. 3, the Node B 300 includes: an estimation unit 301, configured to estimate an uplink load increment of the target BF-control cell Cell B due to the change of the beam direction, before the beam direction turns from towards a current BF-control cell Cell A to towards a target BF-control cell Cell B; a comparison unit 303, configured to compare the estimated uplink load increment with an available uplink load headroom of the target BF-control cell Cell B; and an adjustment unit 305, configured to adjust an uplink load grant of a user equipment UE so that the uplink load increment of the target BF-control Cell B is not beyond the available uplink load headroom of the cell, if the uplink load increment is larger than the available uplink load headroom. The adjustment unit 305 does not adjust the uplink load grant of the UE, if the uplink load increment of the cell is not larger than the variable uplink load headroom of the cell.

When the current BF-control cell Cell A and the target BF-control cell Cell B do not belong to the same Node B, the estimation unit 301 cannot accurately acquire Dedicated Physical Control Channel (DPCCH) measurements (such as DPCCH CIR, etc.) of the UE, thereby cannot estimate the uplink load increment of the target BF-control cell Cell B. In this case, the estimation unit 301 may decrease the uplink load grant of the UE to a predetermined conservative level before the beam direction turns from towards the current BF-control cell Cell A to towards the target BF-control cell Cell B, so that uplink load increment due to the change of the beam direction is not beyond the available uplink load headroom for the target BF-control cell Cell B after the beam direction changes to towards the target BF-control cell Cell B.

The Node B 300 further includes a precoding vector generation and determination unit 307, which is configured to generate and determine, for a UE in a Close Loop BeamForming (CLBF) mode, a precoding vector which should be used when signals are transmitted, so that the beam from the UE in the CLBF mode is adjusted to initially direct towards the current BF-control cell Cell A, and after the uplink load grant is adjusted, the precoding vector generation and determination unit 307 starts to generate and determine the precoding vector for the CLFB UE, so that the beam from the UE in the CLBF mode is directed towards the target BF-control cell Cell B, and stops generating and determining a precoding vector for the UE in the CLBF mode which causes the beam to direct towards the current BF-control cell Cell A.

Preferably, the Node B 300 further includes a delay unit (not shown), which is configured to delay the change of the beam direction turning from towards the current BF-control cell Cell A to towards the target BF-control cell Cell B for the UE in the CLBF mode, during which the beam direction maintains towards the current BF-control cell Cell A. The estimation unit 301, the comparison unit 303 and the adjustment unit 305 may operate during the delay.

Figure 4:
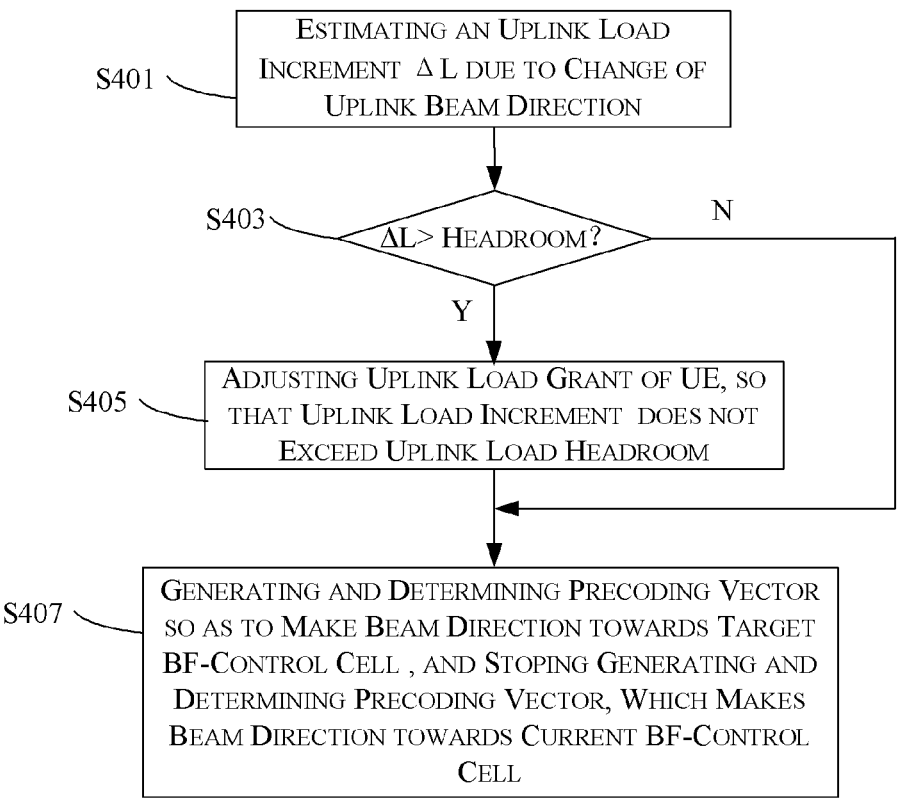
FIG. 4 shows a flow chart of a method for adjusting uplink load variance due to uplink beam direction change according to an embodiment of the present invention.

Hereinafter, a method executed by the Node B 300 for adjusting uplink load variance due to beam direction change according to an embodiment of the present invention will be described in combination with FIG. 4.

During the BF-control cell change of a UE, the RoT oscillation in the target BF-control should be controlled below the RoT limit, i.e., after the BF-control cell change, the RoT of the target BF-control cell should not be higher than the RoT target.

For a CLBF UE, as noted above, the precoding vector generation and determination unit 307 in the Node B 300 may provide the UE with an explicit feedback indicating which weights the UE should use when transmitting a signal. That is, the precoding vector generation and determination unit 307 may generate and determine, for a CLBF UE, a precoding vector which should be used when signals are transmitted, so that the beam from the CLBF UE is adjusted to initially direct towards the current BF-control cell Cell A. Therefore, since the current BF-control cell Cell A has been known at the network side, actions may be taken at the network side to control the RoT oscillation due to the uplink beam direction tuning from towards the current BF-control cell Cell A to the target BF-control cell Cell B.

Some associated RRC signaling can be defined to notice all of the CLBF UE, the current BF-control cell and the target BF-control cell about the BF-control cell change.

According to an embodiment of the present invention, when the target BF-control cell Cell B is informed by the RNC that the BF-control cell of the CLBF UE is going to be changed, the target BF-control cell Cell B may predict the uplink load variation due to the uplink beam direction change of the CLBF UE and adjust the uplink load of this CLBF UE or some other served UEs in the cell so as to ensure the uplink load variation in the target BF-control cell Cell B resulted from the uplink beam direction change of the CLBF UE within an acceptable range.

At step S401, the target BF-control cell Cell B estimates an uplink load increment due to a change of an uplink beam direction by using the estimation unit 301 in the Node B. This can be performed before the actual beam direction change happens.

The target BF-control cell Cell B can estimate its uplink load increment due to a change of a beam direction based on DPCCH measurements of the CLBF UE (such as DPCCH CIR targets, the measured DPCCH CIR, etc.). For example, the load variance may be estimated based on a load difference between the load estimated based on the target DPCCH CIR and that estimated based on the actually measured DPCCH CIR of the UE's target BF-control cell. The DPCCH CIR in the target BF-control cell Cell B should increase with the uplink beam direction change of the UE, and the DPCCH CIR of the target BF-control cell Cell B should not exceed the DPCCH CIR target. Hence, the uplink load increment in the target BF-control cell Cell B can be estimated in accordance with Equation (2) as follows:

$$\Delta L_{tgtBfCell} = L(k \cdot dpcchCir_{tgt}) - L(dpcchCir_{meas}) \qquad (2)$$

where $\Delta L_{tgtBfCell}$ is the uplink load increment due to the uplink beam change of the CLBF UE, $L(k \cdot dpcchCir_{tgt})$ is an estimated uplink load based on the DPCCH CIR target of the UE, k is a coefficient within 0~1, and $L(dpcchCir_{meas})$ is an estimated uplink load based the measured DPCCH CIR in the target BF-control cell Cell B.

k is an empirical factor which can be tuned according to various factors, for instance, a handover gain, uplink beamforming capability, and an uplink transmit bit-rate of the CLBF UE.

At step S403, the target BF-control cell Cell B compares the uplink load increment $\Delta L_{tgtBfCell}$ with the available uplink load headroom of this cell by using the comparison unit 303.

If $\Delta L_{tgtBfCell}$ is higher than the available uplink load headroom, the target BF-control cell Cell B adjusts the uplink load grant of the served UEs by using the adjustment unit 305 in the Node B at step S405, so that the uplink load increment $\Delta L_{tgtBfCell}$ due to the change of the uplink beam direction does not exceed the available uplink load headroom. Otherwise, if $\Delta L_{tgtBfCell}$ is not higher than the available uplink load headroom, the target BF-control cell Cell B does not adjust the uplink load/grant of the served UEs by using the adjustment unit 305 in the Node B.

At step S407, the target BF-control cell Cell B, by using the precoding vector generation and determination unit 307, starts to generate and determine a precoding vector for the CLBF UE so as to make the beam direction towards the target BF-control cell Cell B, and stops generating and determining a precoding vector for this CLBF UE, which makes the beam direction towards the current BF-control cell Cell A.

According to this embodiment, during the period when the target BF-control cell Cell B is adjusting the uplink load of the served UEs, the current BF-control cell Cell A can still generate and determine the precoding vector for the CLBF UE. Another alternative lies in that the current BF-control cell Cell A does not generate the precoding vector while the CLBF UE does not change the precoding vector during this transition period if the transition period is short enough.

According to another embodiment of the present invention, when the current BF-control cell Cell A is informed by the RNC that the BF-control cell of the UE is going to be changed, the current BF-control cell Cell A pre-adjusts the uplink load grant of the CLBF UE.

When the target BF-control cell Cell B and the current BF-control cell Cell A belong to different NodeBs, the current BF-control cell Cell A cannot acquire, by the estimation unit 301, a DPCCH measurement of the UE, such as DPCCH CIR and the like, hence cannot actually learn how much the load of the CLBF UE should be decreased in order to mitigate the RoT oscillation in the target BF-control cell Cell B. In this case, the current BF-control cell Cell A can decrease the uplink load grant of the CLBF UE to a predetermined conservative level by using the estimation unit 301 in the Node B before the uplink beam direction change of the UE.

When the target BF-control cell Cell B and the current BF-control cell Cell A belong to the same Node B, the current BF-control cell Cell A can get the estimated uplink load increment due to the uplink beam direction change as well as the available uplink load headroom in the target BF-control cell Cell B. The uplink load grant of the CLBF UE can be pre-adjusted by the current BF-control cell Cell A so that the uplink load increment due to a change of the uplink beam direction does not exceed the available uplink load headroom after the BF-control cell change.

In other embodiments, for example in LTE, even if the target BF-control cell Cell B and the current BF-control cell Cell A do not belong to the same Node B, the current BF-control cell Cell A may get the estimated uplink load increment of the target BF-control cell Cell B due to the change of the uplink beam direction and the available uplink load headroom of the target BF-control cell Cell B via X2 interface between an eNode B, to which the current BF-control cell Cell A belongs, and an eNode B, to which the target BF-control cell Cell B belongs. Therefore, it is also possible to pre-adjust the uplink load grant of the CLBF UE by the current BF-control cell Cell A, so that the uplink load increment due to the change of the uplink beam direction does not exceed the available uplink load headroom after the BF-control cell change.

Specifically, at step S401, the current BF-control cell Cell A may get the estimated uplink load increment due to the change of the uplink beam direction by the estimation unit 301 in the Node B, before the beam direction change actually happens.

At step S403, the current BF-control cell Cell A may compare the uplink load increment $\Delta L_{tgtBfCell}$ with the available uplink load headroom of the cell by using the comparison unit 303 in the Node B.

If $\Delta L_{tgtBfCell}$ is higher than the available uplink load headroom, the current BF-control cell Cell A decreases the uplink load grant of the served UEs by using the adjustment unit 305 in the Node B at step S405, so that the uplink load increment $\Delta L_{tgtBfCell}$ due to the change of the uplink beam direction does not exceed the available uplink load headroom. Otherwise, the current BF-control cell Cell A does not adjust the uplink load/grant of the served UEs by using the adjustment unit 305 in the Node B.

At this time, the processing performed by the current BF-control cell Cell A is similar to that performed by the target BF-control cell Cell B as noted above.

Thereafter, at step S407, by using the precoding vector generation and determination unit 307, the target BF-control cell Cell B starts to generate and determine a precoding vector for the CLBF UE so as to make the beam direction towards target BF-control cell Cell B, and stops generating and determining a precoding vector for this CLBF UE, which makes the beam direction towards the current BF-control cell Cell A.

Moreover, according to the present invention, some related RRC signaling can be specified by the delay unit in the Node B to delay the beam change for a predetermined short period after the network decides to change the BF-control cell of a UE, i.e. to prolong a transition period of the BF-control cell change of the UE, during which the current BF-control cell Cell A still generates the precoding vector and the UE keeps the uplink beam towards the current BF-control cell Cell A. During such a transition period, the current or the target BF-control cell can pre-adjust the uplink grants of the CLBF UE in order to keep the uplink stability. If the serving cell is specified as the BF-control cell of the CLBF UE, the transition period should be included in a change procedure of the serving cell.

For the time being, an algorithm for adjusting the uplink beam of OLBF UEs may not be specified in future, which means UEs from different vendors can use different OLBF schemes. The uplink beam direction change performance can be very different between OLBF UEs from different vendors. Due to this, the too large and frequent uplink beam direction change can result in the uplink instability for the OLBF UEs, it is worth to pre-define some criteria to limit speeds and frequencies for the uplink beam direction change. This can be done by various ways, for instance:

defining that the accumulative uplink beam direction change times or steps within a pre-defined period should be smaller than a pre-defined limit;

defining that uplink precoding vector update period and the step of the uplink beam direction change, for instance, a UE is only allowed to adjust the uplink beam direction for 10 degrees (i.e. uplink beam direction change step) in 10 ms (i.e. uplink beam direction change period).

Load handling for a change of the uplink bean direction for an OLBF UE is similar to that for the change of the uplink beam direction for the CLBF UE, which may particularly refer to respective steps in the method 400 as noted above.

Load handling for the load due to the change of the uplink beam direction for the OLBF UE differs to that for the change of the uplink beam direction for the CLBF UE only in that the current/target BF-control cell estimates, by using the estimation unit 301 of the Node B, the uplink load increment by using an empire beamforming gain in accordance with the beam forming capability and the uplink load of the UE before activating the uplink beam forming (if the uplink beam forming is activated for the UE), other than estimating the load increment depending on a load difference between a load estimated based on a target DPCCH quality such as a target DPCCH CIR and that estimated based on the actual DPCCH quality such as the measured DPCCH CIR of the target BF-control cell of the UE.

The foregoing embodiments have given illustrative descriptions on the present invention. From a UE perspective, the technical solutions of the present invention can ensure the uplink stability and connectivity while enhancing the uplink system performance. From a network perspective, the technical solutions of the present invention can ensure the network stability and controllability.

It should be appreciated that different steps of the above method may be implemented by a programmable computer. Herein, some embodiments also include a machine-readable or computer-readable program storing device (such as digital data storage medium) and coding machine-executable or computer-executable program instructions, which may perform some or all of the steps of the above method. For instance, the program storing device may be a digital memory, a magnetic storage medium such as a magnetic disk and a tape, hardware or optical readable digital data storage medium. The embodiments may include a programmable computer for performing the steps of the above method as well.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method of adjusting uplink load variance, comprising steps of:
   prior to a user equipment (UE) changing a beam direction of a beam turning from towards a current beamforming control cell to towards a target beamforming control cell, estimating an uplink load increment of the target beamforming control cell due to the UE's beam direction turning from toward the current beamforming control cell to towards the target beamforming control cell;
   comparing the estimated uplink load increment with an available uplink load headroom of the target beamforming control cell; and
   adjusting an uplink load grant of another UE currently being served by the target beamforming control cell if the estimated uplink load increment is larger than the available uplink load headroom, so that the an uplink load increment is not beyond the available uplink load headroom, wherein the UE being in a close loop beamforming (CLBF) mode determines a precoding vector based on an explicit feedback from a base station.

2. The method according to claim 1, further comprising:
   not adjusting the uplink load grant of any of the UE and the other UE, if the estimated uplink load increment is not larger than the available uplink load headroom.

3. The method according to claim 1, the explicit feedback indicating the precoding vector to be used when signals are transmitted by the UE, so that the beam from the UE being in the CLBF mode is initially directed towards the current beamforming control cell.

4. The method according to claim 1, wherein after the uplink load grant is adjusted, the target beamforming control cell starts to generate and determine a precoding vector of the UE being in a CLBF mode, so that the beam from the UE being in the CLBF mode is directed towards the target beamforming control cell, and the current beamforming control cell stops generating and determining a precoding vector of the UE being in the CLBF mode which causes the beam to direct towards the current beamforming control cell.

5. The method according to claim 1, wherein the uplink load increment of the target beamforming control cell due to the change of the beam direction is estimated for the UE being in a CLBF mode, depending on a measurement of a dedicated physical control channel (DPCCH) of the UE.

6. The method according to claim 5, wherein the measurement of the DPCCH of the UE depends on an uplink load difference between an uplink load estimated based on a target DPCCH carrier interference ratio (CIR) of the UE and an uplink load estimated based on a DPCCH CIR measured in the target beamforming control cell.

7. The method according to claim 1, wherein the uplink load increment of the target beamforming control cell due to the change of the beam direction is estimated for the UE being in an open loop beamforming (OLBF) mode by using an empirical beam forming gain.

8. The method according to claim 3, further comprising:
   delaying the change of the beam direction turning from towards the current beamforming control cell to towards the target beamforming control cell for the UE being in the CLBF mode, during which the current beamforming control cell maintains generating and determining the precoding vector, and the beam direction maintains towards the current beamforming control cell.

9. The method according to claim 8, wherein the estimating, comparing, and adjusting steps are performed during the delay.

10. The method according to claim 1, wherein the uplink load grant of the UE is decreased to a predetermined conservative level before the change of the beam direction when the current beamforming control cell of the UE cannot accurately obtain the uplink load increment, so that the uplink load increment is not beyond the available uplink load headroom after the beam is directed towards the target beamforming control cell.

11. A base station for adjusting uplink load variance, comprising:
   a processor and computer-readable storage medium couple to the processor, the computer-readable storage medium including:
      an estimation unit, configured to, prior to a user equipment (UE) changing a beam direction of a beam turning from towards a current beamforming control cell to towards a target beamforming control cell, estimate an uplink load increment of the target beamforming control cell due to the UE's beam direction turning from towards the current beamforming control cell to towards the target beamforming control cell;
      a comparison unit, configured to compare the estimated uplink load increment with an available uplink load headroom of target beamforming control cell;
      an adjustment unit, configured to adjust an uplink load grant of another UE currently being served by the target beamforming control cell so that an uplink load increment is not beyond the available uplink load headroom, if the estimated uplink load increment is larger than the available uplink load headroom
      a precoding vector generation and determination unit configured to determine a precoding vector based on an explicit feedback from a base station when the UE is in a close loop beamforming (CLBF) mode.

12. The base station according to claim 11, wherein the adjustment unit is configure not to adjust the uplink load grant of any of the UE and the other UE, if the uplink load increment is not larger than the available uplink load headroom.

13. The base station according to claim 11, further comprising the precoding vector generation and determination unit, configured to generate and determine, for the UE being in a close loop beamforming (CLBF) mode, a precoding vector that to be used when signals are transmitted, so that the beam from the UE being in the CLBF mode is adjusted to initially direct towards the current beamforming control cell.

14. The base station according to claim 11, further comprising the precoding vector generation and determination unit, wherein after the uplink load grant is adjusted, the precoding vector generation and determination unit starts to generate and determine a precoding vector of the UE being in a CLBF mode, so that the beam from the UE being in the CLBF mode is directed towards the target beamforming control cell, and stops generating and determining a precoding vector of the UE being in the CLBF mode which causes the beam to direct towards the current beamforming control cell.

15. The base station according to claim 11, wherein the estimation unit is configured to estimate, for the UE being in a CLBF mode, the uplink load increment of the target beamforming control cell due to the change of the beam direction, depending on a measure of a dedicated physical control channel (DPCCH) of the UE.

16. The base station according to claim 15, wherein the measure of the DPCCH of the UE depends on an uplink load difference between an uplink load estimated based on a target DPCCH carrier interference ratio (CIR) of the UE and an uplink load estimated based on a DPCCH CIR measured in the target beamforming control cell.

17. The base station according to claim 11, wherein the estimation unit is configure to estimate, for the UE being in an open loop beamforming (OLBF) mode, the uplink load increment of the target beamforming control cell due to the change of the beam direction by using an empirical beam forming gain.

18. The base station according to claim 13, further comprising:
a delay unit, configured to delay the change of the beam direction turning from towards the current beamforming control cell to towards the target beamforming control cell for the UE being in the CLBF mode, during which the current beamforming control cell maintains generating and determining the precoding vector, and the beam direction maintains towards the current beamforming control cell.

19. The base station according to claim 18, wherein the estimate unit, the comparison unit, and the adjustment unit operate during the delay.

20. The base station according to claim 11, wherein the uplink load grant of the UE is to be decreased to a predetermined conservative level before the change of the beam direction when the current beamforming control cell of the UE cannot accurately obtain the uplink load increment by the estimation unit, so that the uplink load increment is not beyond the available uplink load headroom after the beam is directed towards the target beamforming control cell.

* * * * *